US012660068B2

(12) United States Patent
Nesensohn

(10) Patent No.: US 12,660,068 B2
(45) Date of Patent: Jun. 16, 2026

(54) SIGNAL GENERATOR MODULE FOR DIMMING OF A LUMINAIRE

(71) Applicant: Tridonic GmbH & Co KG, Dornbirn (AT)

(72) Inventor: Christian Nesensohn, Götzis (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 18/848,279

(22) PCT Filed: Mar. 29, 2023

(86) PCT No.: PCT/EP2023/058196
§ 371 (c)(1),
(2) Date: Sep. 18, 2024

(87) PCT Pub. No.: WO2023/208505
PCT Pub. Date: Nov. 2, 2023

(65) Prior Publication Data

US 2025/0212306 A1 Jun. 26, 2025

(30) Foreign Application Priority Data

Apr. 27, 2022 (EP) .................................... 22170227

(51) Int. Cl.
*H05B 47/18* (2020.01)
*H05B 45/10* (2020.01)

(52) U.S. Cl.
CPC ........... *H05B 47/183* (2024.01); *H05B 45/10* (2020.01)

(58) Field of Classification Search
CPC ....... H05B 45/10; H05B 47/183; H05B 35/00
See application file for complete search history.

(56) References Cited

U.S. PATENT DOCUMENTS

2012/0104964 A1* 5/2012 Hughes .................. H05B 45/14 315/291
2013/0147376 A1 6/2013 Trainor et al.
2014/0361701 A1 12/2014 Siessegger et al.
2015/0163880 A1* 6/2015 Sun ........................ H05B 45/10 315/250

OTHER PUBLICATIONS

PCT/EP2023/058196, International Search Report and Written Opinion dated May 30, 2023, 6 pages.

* cited by examiner

*Primary Examiner* — Raymond R Chai
(74) *Attorney, Agent, or Firm* — Andrus Intellectual Property Law, LLP

(57) ABSTRACT

The invention relates to a signal generator module, comprising: input terminals for supplying a low-DC voltage from a LED driver, an interface for manually or electronically supplying a signal generator control command, a circuitry for generating a digital output signal preferably with a mains frequency during a defined state of the signal generator control command, and output terminals configured to supply the digital output signal to at least one input terminal of the LED driver.

12 Claims, 7 Drawing Sheets

SIGNAL GENERATOR MODULE FOR DIMMING OF A LUMINAIRE

CROSS REFERENCE TO RELATED APPLICATIONS

The present application is the U.S. national stage application of international application PCT/EP2023/058196 filed Mar. 29, 2023, which international application was published on Nov. 2, 2023 as International Publication WO 2023/208505 A1. The international application claims priority to European Patent Application No. 22170227.7 filed Apr. 27, 2022.

TECHNICAL FIELD OF THE INVENTION

The invention relates to a signal generator module for dimming of a luminaire, as well as to a system comprising such module together with a driver for (LED) lighting means.

BACKGROUND OF THE INVENTION

In order to perform a dimming of a luminaire, it is known to selectively loop a mains voltage supply to a control input of a luminaire driver when a button or switch is actuated by a human user. The driver applies this looped AC mains voltage to a comparator threshold (e.g., the zero-crossing threshold or a slightly asymmetrically offset threshold) and, then, counts the number of looped pulses. Afterwards, depending on the number of looped pulses, a specific operation, such as dimming up or down of the luminaire, can be performed depending on the pulse sequence. For example, a short pulse sequence can cause an up dimming and a long pulse sequence can cause a down dimming (or vice versa) of the luminaire.

A disadvantage of this well-known solution is that due to the fact that the AC mains voltage is being looped at an interface of the driver, the button or switch needs to be properly isolated which leads to relatively large component sizes and higher component costs.

Thus, it is an objective to provide an improved signal generator module and method for dimming of a luminaire which avoid the above-mentioned disadvantages.

SUMMARY OF THE INVENTION

The object of the present invention is achieved by the solution provided in the enclosed independent claims. Advantageous implementations of the present invention are further defined in the dependent claims.

According to a first aspect of the invention, a signal generator module is provided. The signal generator module comprises input terminals for supplying a low-DC voltage from a LED driver, an interface for manually or electronically supplying a signal generator control command, a circuitry for generating a cyclic (i.e. cycling between HIGH and LOW) digital output signal preferably with a mains frequency during a defined state (e.g. the pushed state of a push button or the a logical state of a supplied external signal) of the signal generator control command, and output terminals configured to supply the digital output signal to at least one input terminal of the LED driver.

This provides the advantage that no mains voltage is needed for the dimming of a luminaire by means of the signal generator module. Instead of the mains voltage, a digital output signal with the same or similar frequency as the mains voltage can be used as a dimming signal. For instance, this reduces isolation requirements such that more compact components can be used. The cycling digital output mimics perfectly, as to the comparator processing, a selectively supplied AC mains voltage. To this regard, the HIGH level is set to be higher than the threshold set in a driver, and to last as long as the amplitude of a AC voltage would be higher than this threshold. The LOW level is set to be lower than the comparator threshold and lasts as long as the AC voltage amplitude would be lower than the comparator threshold of the driver.

The luminaire can be a LED luminaire. The LED luminaire can comprise at least one dimmable LED modules.

The digital output signal can be a digital signal with a frequency which is identical or similar to the frequency of the mains voltage.

In a preferred embodiment, the input terminals of the module are the same as the output terminals of the module.

In a preferred embodiment, the input terminals of the module are different from the output terminals of the module.

In a preferred embodiment, the interface is a manually operated button or switch.

This provides the advantage that the button is small and does not need to be isolated, thus costs can be reduced. For instance, the button can be a push button.

In a preferred embodiment, an impulse sequence is generated which comprises two discrete states.

The two discrete states can be two signal levels, namely a low and a high level. The signal levels can be low voltage levels.

In a preferred embodiment, the low-DC voltage is a voltage from DALI bus terminals of the LED driver.

In a preferred embodiment, the circuitry comprises a buffer circuit configured to supply the circuitry with energy.

In a preferred embodiment, the buffer circuit comprises a capacitor.

In a preferred embodiment, the circuitry comprises a time module, wherein a frequency of the time module is determined by a resistor divider and a capacitor.

According to a second aspect, the invention relates to a system comprising a signal generator module according to the first aspect or any one of the preferred embodiments thereof connected to an LED driver. The LED driver has one or more input terminals supplied with the digital output signal. Inside the LED driver this signal is supplied to a comparator. The cycling digital output mimics perfectly, as to the comparator processing, a selectively supplied AC mains voltage. To this regard, the HIGH level is set to be higher than the threshold set in a driver, and to last as long as the amplitude of a non-rectified AC voltage would be higher than this threshold. The LOW level is set to be lower than the comparator threshold and lasts as long as the AC voltage amplitude would be lower than the comparator threshold of the driver.

In a preferred embodiment, the LED driver is configured to adapt at least one operation parameter of an LED module as a function of a digital output signal of the signal generator module.

The at least one operation parameter of the LED module can be a dimming level of the LED module.

According to a third aspect, the invention relates to a method for dimming of a luminaire, comprising: supplying a low-DC voltage from a LED driver; manually or electronically supplying a signal generator control command from an interface; generating a digital output signal preferably with a mains frequency during a defined state of a signal generator control command by means of a circuitry; and suppling a digital output signal to at least one input terminal of the LED driver.

BRIEF DESCRIPTION OF THE DRAWINGS

The invention will be explained in the followings together with the figures.

DETAILED DESCRIPTION OF THE EXEMPLARY EMBODIMENTS

Aspects of the present invention are described herein in the context of a signal generator module.

'LED luminaire' shall mean a luminaire with a light source comprising one or more LEDs or OLEDs. LEDs are well-known in the art, and therefore, will only briefly be discussed to provide a complete description of the invention.

Figure 1:
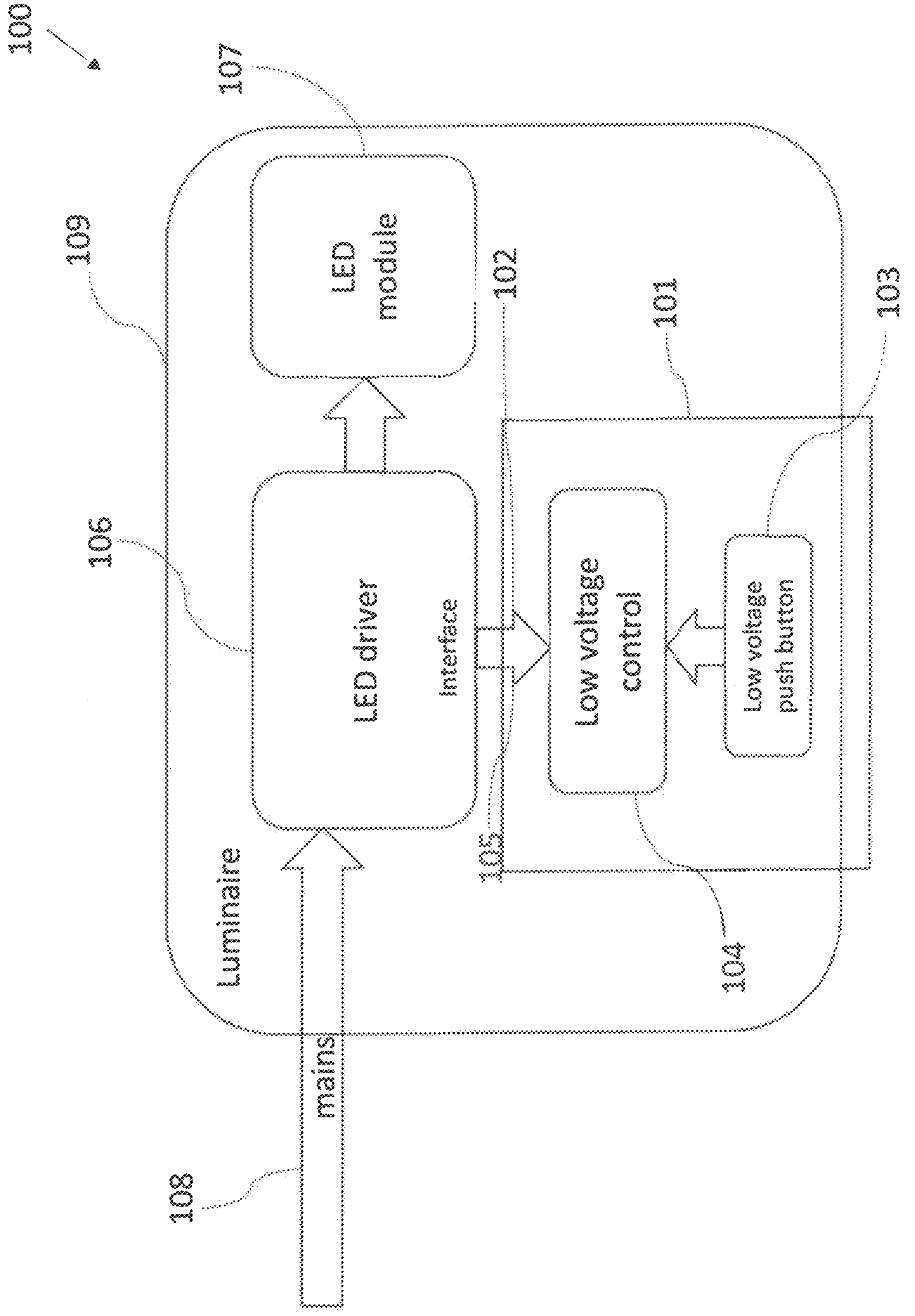
FIG. 1 shows a system comprising a luminaire and a signal generator module according to an embodiment.

Now referring to FIG. 1, a system 100 comprising a driver (e.g. in a luminaire 109) and a signal generator module 101 according to an embodiment is shown. The module 101 issues a digital signal to an input terminal of the driver.

The signal generator module 101 comprises: input terminals 102 for supplying a low-DC voltage from a LED driver 106, an interface 103 for manually or electronically supplying a signal generator control command, a circuitry 104 for generating a digital output signal preferably with a mains frequency during a defined state of the signal generator control command, and output terminals 105 configured to supply the digital output signal to at least one input terminal of the LED driver 106.

The cycling digital output mimics perfectly, as to the comparator processing, a selectively supplied AC mains voltage. To this regard, the HIGH level is set to be higher than the threshold set in a driver, and to last as long as the amplitude of a non-rectified AC voltage would be higher than this threshold. The LOW level is set to be lower than the comparator threshold and lasts as long as the AC voltage amplitude would be lower than the comparator threshold of the driver.

Thus, no change on the side of the driver is required when using the module of the invention instead of a selectively forwarded bipolar AC voltage.

The system 100 further comprises a luminaire 109. This luminaire 109 can comprise the signal generator module 101, the LED driver 106 and an LED module 107, wherein the LED module 107 can be connected to the LED driver 106. The LED driver 106 can be supplied with energy by the mains supply 108. Moreover, the LED driver 106 can be configured to adapt at least one operation parameter of the LED module 107, in particular a dimming of the LED module 107, as a function of the digital output signal of the signal generator module 101.

The input terminals 102 (DC power supply terminals) of the module 101 can be the same as the output terminals 105 of the module 101, i.e. the same terminals are used for input and output. Alternatively, the input terminals 102 of the module 101 can be different from the output terminals 105 of the module 101.

To control a dimming of the luminaire, the digital output signal sequence, which has the same or a similar frequency as the AC mains voltage, can be generated by the circuitry 104, when the interface 103, e.g. a button or switch is actuated. During an actuation of said button or switch, an impulse sequence can be generated which comprises two discrete states. For example, a pulse sequence of on/off or high/low pulses is generated and fed to a control input of the LED driver 106, with the lower level of the pulse sequence being below a discrimination threshold and the upper level of the pulse sequence being above the discrimination threshold, particularly just above the discrimination threshold. The pulse sequence can be evaluated by an evaluation circuit in the LED driver 106 which compares the signal levels of the pulse sequence with the discrimination threshold.

Thus, compared to traditional dimming methods, there is a low-voltage pulse sequence instead of a looped AC mains voltage. This low-voltage pulse sequence can be evaluated by the driver evaluation circuit essentially in the same way as the looped-through AC mains voltage.

For instance, if the discrimination threshold is the zero level, the duty cycle of the pulse sequence may be 50%. If the discrimination threshold is not the zero level, the pulse sequence may be set to be a duty cycle other than 50% in terms of its duty cycle.

Figure 2:
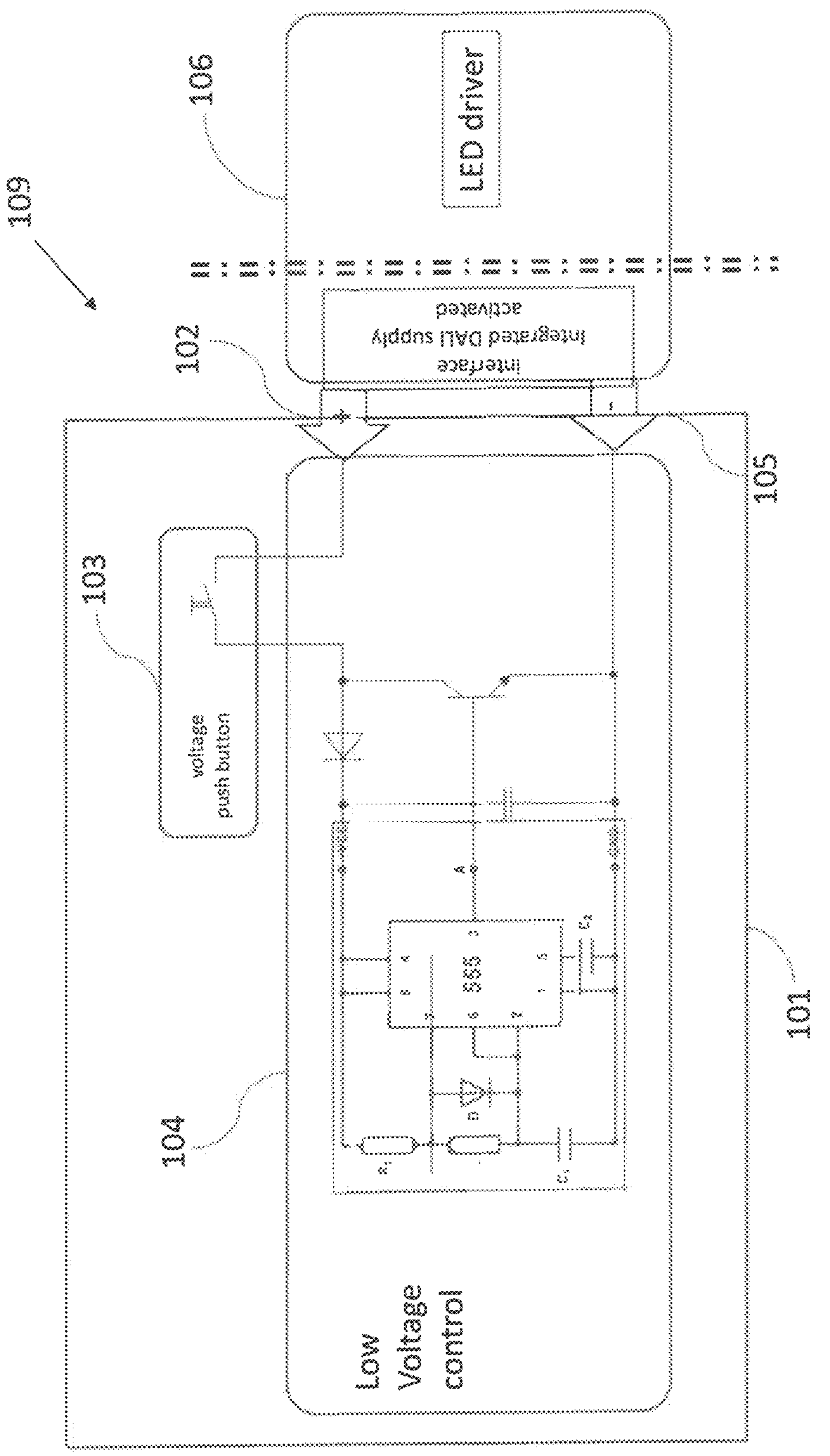
FIG. 2 shows a luminaire comprising a signal generator module according to an embodiment.

FIG. 2 shows a luminaire 109 comprising a signal generator module 101 and an LED driver 106 according to an embodiment.

The signal generator module 101 comprises the circuitry 104. The circuitry 104 is powered by a low-voltage power supply, which can preferably be a low-voltage power supply for the LED driver 106. For example, the low-voltage power supply can be a DALI bus voltage supply in the LED driver 106. When the switch or button 103 is actuated, this low-voltage power supply is applied to the circuitry 104. Typically, a buffer circuit is supplied first, which is charged until a certain charging level is reached. Afterwards, a discrete or integrated circuit can be configured to generate the digital output signal or pulse sequence. The buffer circuit is configured in such a way that the circuitry 104 is also supplied with electrical energy during the low-level or zero-level periods of the pulse sequence.

In another example, long or short pulse sequences are generated when switching on or off the button 103, which can cause a cyclic up and down dimming of the luminaire 109.

The pulse sequence or signal generator control command that is generated during an actuation by a human user is preferably discriminated with regard to two different states (here: short/long). However, other evaluations can also be performed, for example, in form of an analog evaluation. For instance, the duration of the actuation can be evaluated and can directly represent another operating parameter specification of the luminaire 109.

Module 555 shown in FIG. 2 can be a timer module whose frequency is specified by an external circuit (here: resistor divider and capacitor). The capacitor C3 represents the buffer circuit.

The external wiring for the timer module, or another element of a discrete or integrated circuit, can be adjustable from the outside in such a way that the pulse duty factor of the generated pulse sequence or digital output signal can be adjusted.

Figure 3:
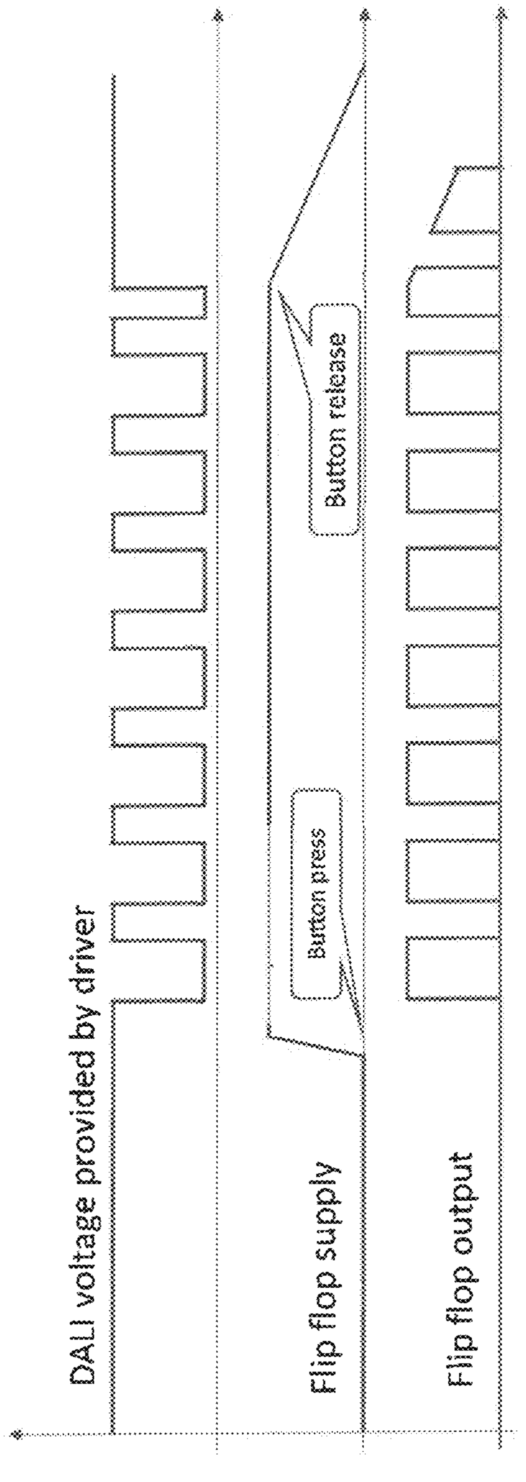
FIG. 3 shows signals generated in a signal generator module according to an embodiment.

FIG. 3 shows signals generated in the signal generator module 101 according to an embodiment.

With regard to FIG. 2 and FIG. 3, if the button 103 is pressed, a flip-flop circuit is supplied (see curve 2 in FIG. 3). The output of the flip-flop starts a square wave (see curve 3 in FIG. 3), wherein the on-off-timings can be defined by R1, R2 and C1 and are aligned with the timings of the circuitry 104. This square wave can short circuit the DALI voltage (see curve 1 in FIG. 3) provided by the LED driver 106 with the same timing. This can imply that a dimming signal is detected and the luminaire dims accordingly. The capacitor C3 can be configured to buffer the supply while it short circuits the DALI voltage, with T1 being the switch for short circuiting. In some examples, the timer 555 can have a sink compatibility which is higher than the current supplied by the LED driver 106 and the switch T1 can be omitted.

Figure 4:
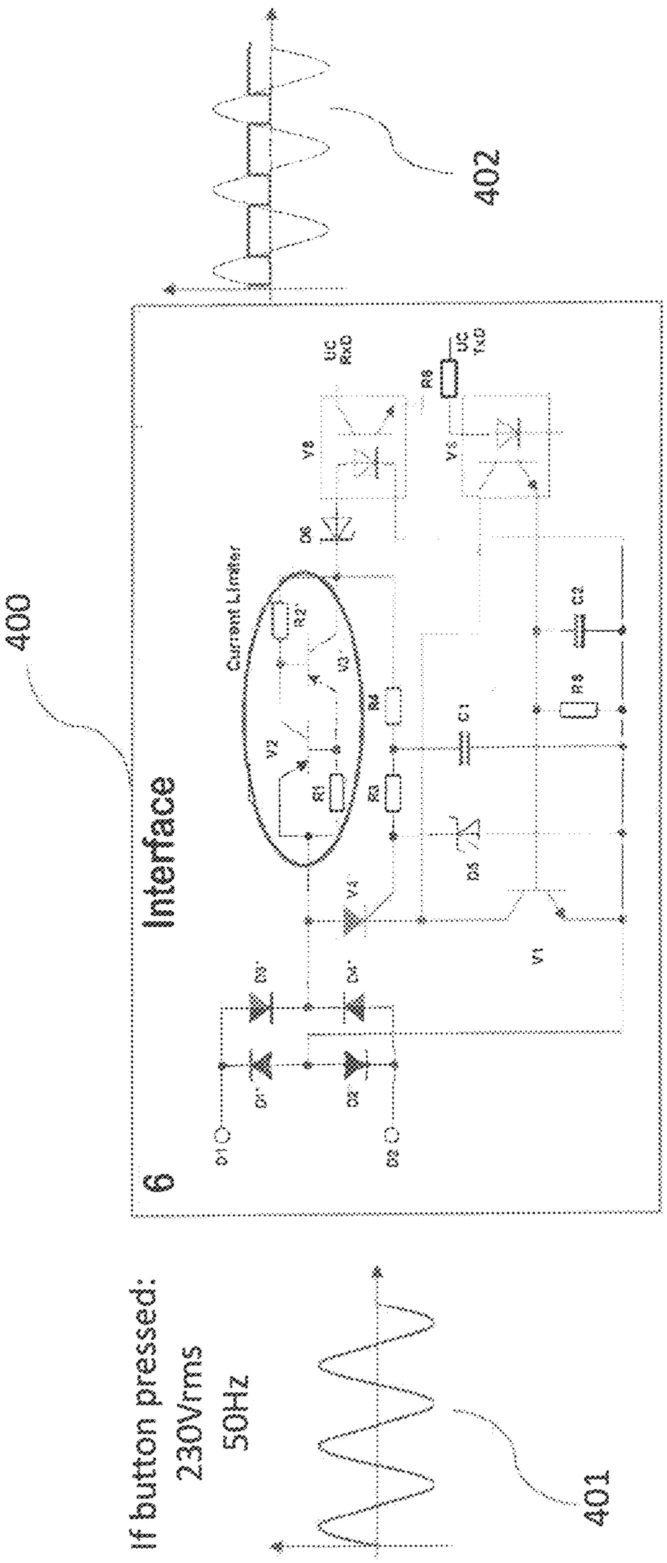
FIG. 4 shows an interface of a luminaire according to prior art.
Figure 5:
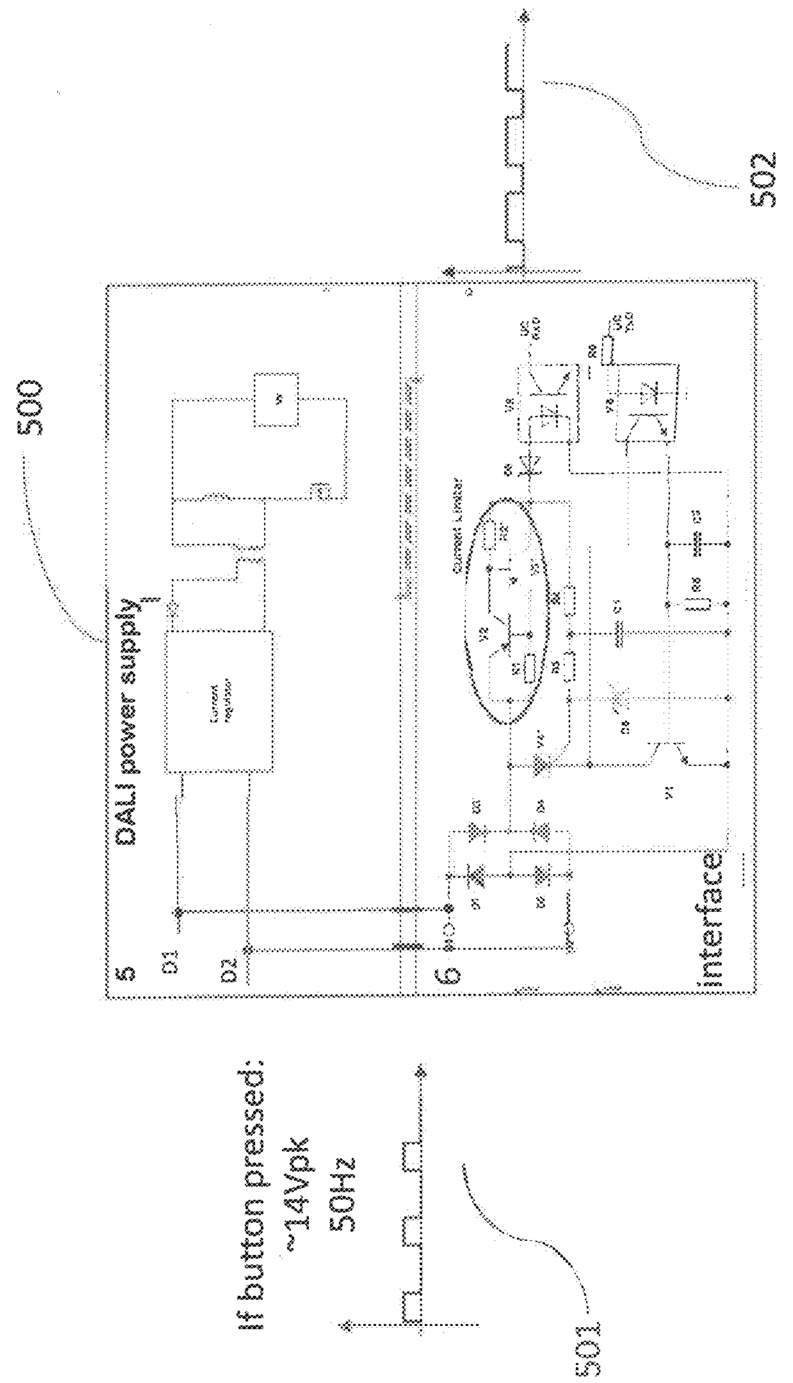
FIG. 5 shows an interface of a luminaire according to an embodiment.

FIG. 4 shows an interface 400 of a luminaire according to prior art, while FIG. 5 shows an interface of the luminaire 109 according to an embodiment of the invention.

In FIG. 4, an AC signal 401 of 50 Hz is given as input to the interface 400 and an output signal 402 is produced, which is used to dim a luminaire. In FIG. 5 instead, if the button or switch is pressed, a digital signal 501 with a frequency of 50 Hz is produced which is given as an input to the module 500 and a signal 502 is produced at the output. The module, for instance, comprises a DALI power supply and the interface 400.

Figure 6:
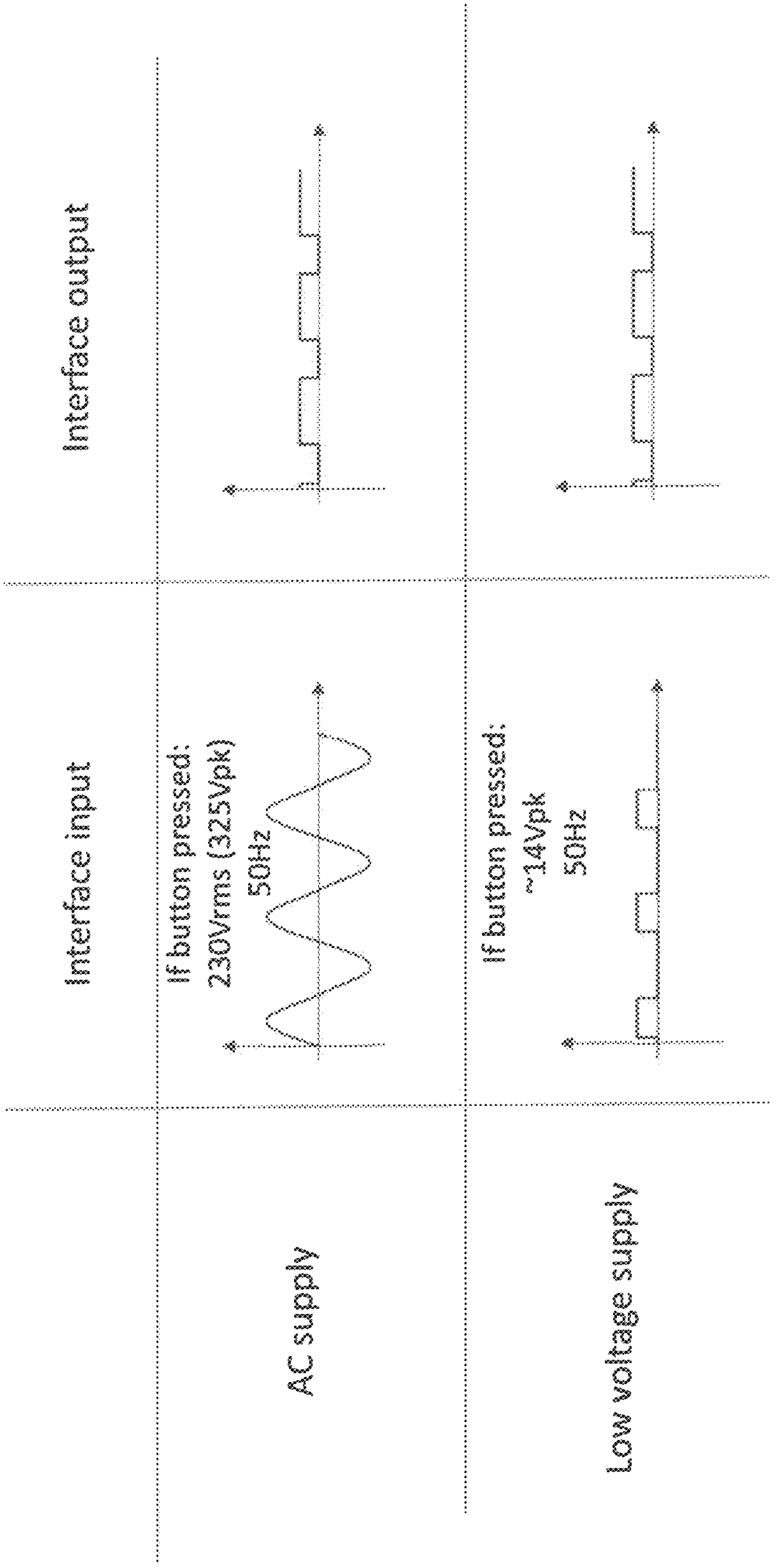
FIG. 6 shows signals generated by a signal generator module according to prior art and according to an embodiment.

In FIG. 6, the respective input and output signals in FIG. 4 and FIG. 5 are compared. In particular, it is worth noticing that, in both cases, the interface output signal can be the same (or similar). However, in the case of the low voltage supply (FIG. 5), there is no need for the main voltage to generate a dimming signal for dimming of the luminaire 109 and the button can be a low voltage button which does not need a strong isolation. The button can, thus, be small and, cheap. In one example, the button can be a surface mounted device, SMD, on a back side of a printed circuit board, PCB, comprising the circuitry 104.

Figure 7:
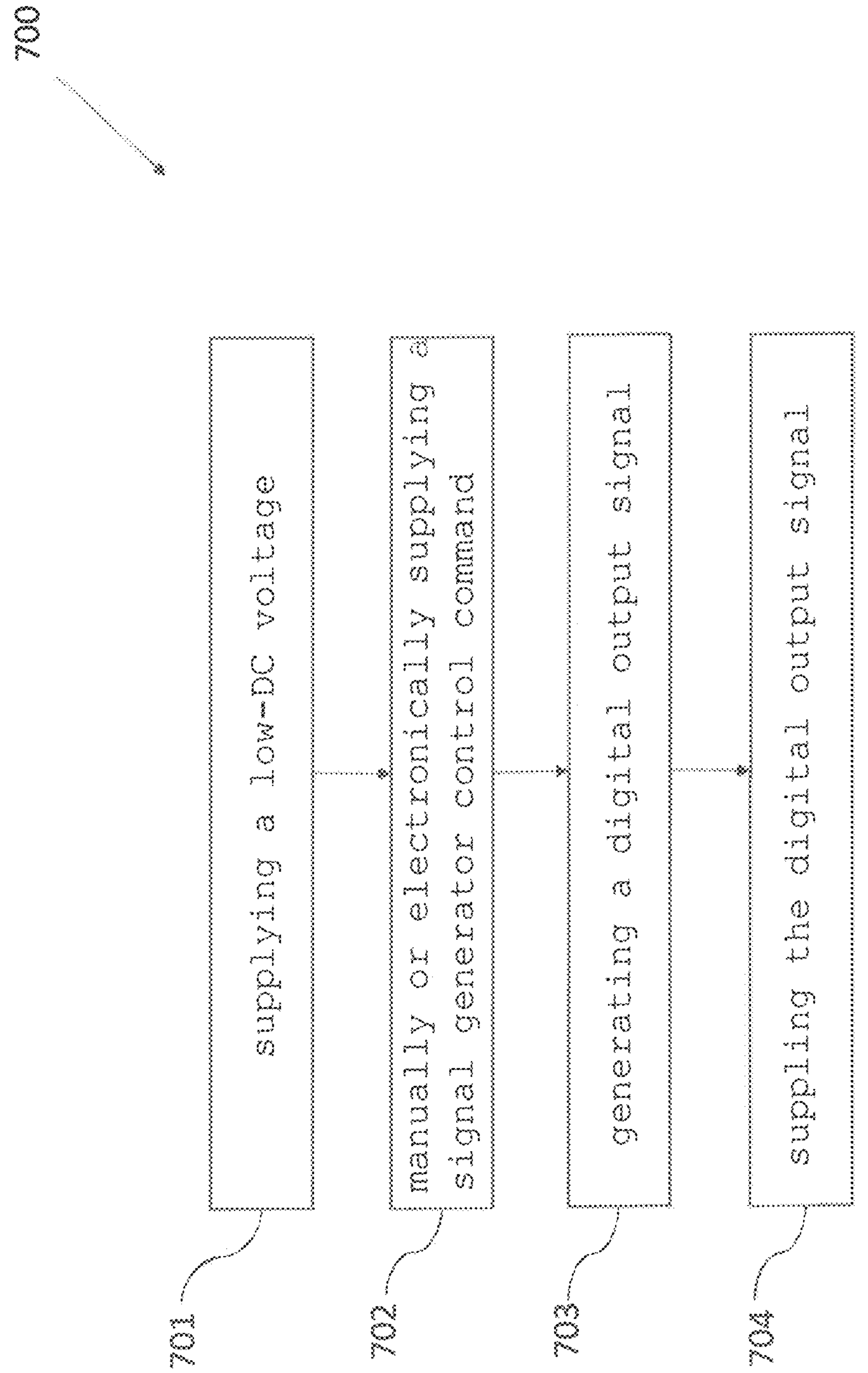
FIG. 7 shows a schematic representation of a method for dimming of a luminaire according to an embodiment.

FIG. 7 shows a schematic representation of a method 700 for dimming of a luminaire 109 according to an embodiment.

The method 700 comprises the steps of:

supplying 701 a low-DC voltage from a LED driver 106;

manually or electronically supplying 702 a signal generator control command from an interface 103;

generating 703 a digital output signal preferably with a mains frequency during a defined state of a signal generator control command by means of a circuitry 104; and suppling 704 the digital output signal to at least one input terminal of the LED driver 106.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. A signal generator module (101), comprising:

input terminals (102) for supplying a low-DC voltage from a LED driver (106);

an interface (103) designed for manually or electronically supplying a signal generator control command;

a circuitry (104) for generating a cyclic digital output signal with a mains frequency during a defined state of the signal generator control command; and output terminals (105) configured to supply the cyclic digital output signal to at least one input terminal of the LED driver (106).

2. The signal generator module (101) according to claim 1, wherein the input terminals (102) of the signal generator module are the same as the output terminals (105) of the signal generator module (101).

3. The signal generator module (101) according to claim 1, wherein the input terminals (102) of the signal generator module (101) are different from the output terminals (105) of the signal generator module (101).

4. The signal generator module (101) according to claim 1, wherein the interface (103) is a manually operated button or switch.

5. The signal generator module (101) of claim 4, wherein, during an operation of the button, an impulse sequence is generated which comprises two discrete states.

6. The signal generator module (101) according to claim 1, wherein the low-DC voltage is a voltage from DALI bus terminals of the LED driver (106).

7. The signal generator module (101) according to claim 1, wherein the circuitry (104) comprises a buffer circuit configured to supply the circuitry (104) with energy.

8. The signal generator module (101) according to claim 7, wherein the buffer circuit comprises a capacitor.

9. The signal generator module (101) according to claim 1, wherein the circuitry (104) comprises a time module, wherein a frequency of the time module is determined by a resistor divider and a capacitor.

10. A system (100) comprising the signal generator module (101) according to claim 1 connected to the LED driver (106).

11. The system (100) of claim 10, wherein the LED driver (106) is configured to adapt at least one operation parameter of an LED module (107) as a function of the cyclic digital output signal of the signal generator module (101).

12. A method (700) for dimming of a luminaire (109), comprising:

supplying (701) a low-DC voltage from a LED driver (106);

manually or electronically supplying (702) a signal generator control command from an interface (103);

generating (703) a digital output signal with a mains frequency during a defined state of a signal generator control command by means of a circuitry (104); and supplying (704) the digital output signal to at least one input terminal of the LED driver (106).

* * * * *